(12) United States Patent
Miyagawa et al.

(10) Patent No.: US 12,428,880 B2
(45) Date of Patent: Sep. 30, 2025

(54) HOOD LATCH ASSEMBLY

(71) Applicant: MITSUI KINZOKU ACT CORPORATION, Kanagawa (JP)

(72) Inventors: Masazumi Miyagawa, Kanagawa (JP); Toshiya Kaneko, Kanagawa (JP); Kumiko Sato, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 804 days.

(21) Appl. No.: 17/252,675

(22) PCT Filed: Jan. 11, 2019

(86) PCT No.: PCT/JP2019/000765
§ 371 (c)(1),
(2) Date: Dec. 15, 2020

(87) PCT Pub. No.: WO2020/008664
PCT Pub. Date: Jan. 9, 2020

(65) Prior Publication Data
US 2021/0262253 A1 Aug. 26, 2021

(30) Foreign Application Priority Data
Jul. 2, 2018 (JP) .................................. 2018-126425

(51) Int. Cl.
*B62D 25/12* (2006.01)
*E05B 79/04* (2014.01)
(Continued)

(52) U.S. Cl.
CPC .............. *E05B 79/04* (2013.01); *B62D 25/12* (2013.01); *E05B 83/243* (2013.01); *E05B 85/243* (2013.01)

(58) Field of Classification Search
CPC ...... E05B 79/04; E05B 83/243; E05B 85/243; E05B 85/26; E05B 83/24; B62D 25/12
See application file for complete search history.

(56) References Cited

U.S. PATENT DOCUMENTS 7,845,692 B2 * 12/2010 Inan .................. E05B 77/40
292/216
9,611,676 B2 * 4/2017 Bendel .................... E05B 85/26
(Continued)

FOREIGN PATENT DOCUMENTS

CN 102729857 A 10/2012
DE 102006035556 A1 1/2008
(Continued)

OTHER PUBLICATIONS

The Extended European Search Report issued in corresponding EP Application No. 19831437.9, dated Feb. 14, 2022.
(Continued)

*Primary Examiner* — Kristina R Fulton
*Assistant Examiner* — Thomas L Neubauer
(74) *Attorney, Agent, or Firm* — Rimon P.C.

(57) ABSTRACT

A hood latch assembly comprising: a striker; a base plate having a striker guiding path; a latch secured to the base plate by a latch shaft, the latch being configured to rotate from an unlatching position to an over-rotation position across a latching position upon engagement with the striker; a latch spring configured to push the latch in an unlatching direction; and a ratchet secured to the base plate by a ratchet shaft, the ratchet being configured to engage with the latch returning to the latching position from the over-rotation position by spring force of the latch spring and to maintain engagement of the latch with the striker, wherein the latch has a ratchet contact arm including a straight portion, the straight portion of the ratchet contact arm being configured (Continued)

to contact a base portion of the ratchet when the latch reaches the over-rotation position.

9 Claims, 7 Drawing Sheets

(51) Int. Cl.
  *E05B 83/24* (2014.01)
  *E05B 85/24* (2014.01)

(56) References Cited

U.S. PATENT DOCUMENTS

| | | | |
|---|---|---|---|
| 10,273,726 B2 * | 4/2019 | Park | E05B 85/26 |
| 2004/0256861 A1 | 12/2004 | Nakagome et al. | |
| 2008/0202176 A1 | 8/2008 | Inan et al. | |
| 2012/0007372 A1 | 1/2012 | Nurmi et al. | |
| 2012/0251231 A1 | 10/2012 | Matsumoto et al. | |
| 2013/0300134 A1 * | 11/2013 | Jayasuriya | E05B 83/24 |
| | | | 292/129 |

FOREIGN PATENT DOCUMENTS

| | | |
|---|---|---|
| DE | 102006056101 A1 | 5/2008 |
| DE | 102014014731 A1 | 3/2016 |
| DE | 102014115025 A1 | 4/2016 |
| JP | S63-268887 A | 11/1988 |
| JP | 2002-129810 A | 5/2002 |
| JP | 2004-100267 A | 4/2004 |
| JP | 2004-360416 A | 12/2004 |
| JP | 2012-211460 A | 11/2012 |
| WO | 2006/133673 A1 | 12/2006 |
| WO | 2015/077549 A1 | 5/2015 |
| WO | 2016058587 A1 | 4/2016 |

OTHER PUBLICATIONS

Notification of Reason for Refusal issued in corresponding Japanese Application No. 2018-126425, dated Nov. 24, 2020, with English translation.

International Search Report issued in corresponding International Patent Applicaiton No. PCT/JP2019/000765, dated Mar. 12, 2019, with English translation.

* cited by examiner

HOOD LATCH ASSEMBLY

CROSS-REFERENCE OF RELATED APPLICATIONS

This application is a National Stage of PCT International Application No. PCT/JP2019/000765 filed on Jan. 11, 2019 which designates the United States, incorporated herein by reference, and which is based upon and claims the benefit of priority from Japanese Patent Application No. 2018-126425 filed on Jul. 2, 2018, the entire contents of which are incorporated herein by reference.

FIELD

The present invention relates to a latch assembly for engine hood and particularly relates to a hood latch assembly with improved strength.

BACKGROUND

A conventional type of hood latch assembly includes, as described in Patent Literature 1, a striker connected to a hood and a latch unit connected to the vehicle body and engaged with the striker. A latch to be engaged with the striker and a ratchet to be engaged with the latch to maintain engagement of the latch and the striker are secured to a base plate of the latch unit. The base plate has a path for guiding the striker. The striker guiding path is U-shaped with an upper opening and a bottom.

As the hood is closed, the striker moves downward to enter the striker guiding path and contacts a striker engagement slot of the latch. This contact renders the latch to over-rotate across a latching position from an unlatching position against the spring force of a latch spring. As the latch is over-rotated, the striker contacts the bottom wall of the striker guiding path and stops. The latch is returned to the latching position by the spring force of the latch spring. The ratchet engages with the returned latch, and closing of the hood is completed.

CITATION LIST

Patent Literature

Patent Literature 1: Japanese Patent Application Laid-open No. 2004-100267
Patent Literature 2: Japanese Patent Application Laid-open No. 2004-360416

SUMMARY

Technical Problem

In conventional types of hood latch assembly, most of the transition force (energy) of the striker to close the hood is received by the bottom of the striker guiding path of the base plate. Large load concentrated on the bottom easily causes distortion and deformation of the base plate. The relative positions of the latch and the ratchet are therefore likely to be deviated to each other, which leads to inaccurate closing and opening of the hood.

Patent Literature 1 separately provides a reinforcing member to the bottom of the striker guiding path; however, since a vehicle (particularly, sport utility vehicle (SUV)) with a large heavy hood causes the striker to have a considerably large transition force to close the hood, the technique has issues of preventing distortion and deformation of the base plate.

Solution to Problem

To solve the problem and achieve the object, a hood latch assembly according to the present invention includes: a striker attached to a hood; a base plate fixed to a vehicle body and having a striker guiding path at an upper center portion, the striker guiding path extending in a vertical direction and being configured to receive the striker; a latch secured to the base plate by a latch shaft, the latch being configured to rotate from an unlatching position to an over-rotation position across a latching position upon engagement with the striker; a latch spring configured to push the latch in an unlatching direction; and a ratchet secured to the base plate by a ratchet shaft, the ratchet being configured to engage with the latch returning to the latching position from the over-rotation position by spring force of the latch spring and to maintain engagement of the latch with the striker, wherein the latch has a ratchet contact arm configured to contact a base portion of the ratchet when the latch reaches the over-rotation position.

Moreover, a hood latch assembly according to the present invention includes: a striker attached to a hood; and a latch unit attached to a vehicle body and configured to engage with the striker, the latch unit including: a base plate having a striker guiding path at an upper center portion, the striker guiding path extending in a vertical direction and being configured to receive the striker; a latch secured to the base plate by a latch shaft, the latch being configured to rotate from an unlatching position to an over-rotation position across a latching position upon engagement with the striker; a latch spring configured to push the latch in an unlatching direction; and a ratchet secured to the base plate by a ratchet shaft, the ratchet being configured to engage with the latch returning to the latching position from the over-rotation position by spring force of the latch spring and to maintain engagement of the latch with the striker, wherein the latch unit includes supporting members configured to contact the latch when the latch reaches the over-rotation position, and the supporting members are configured to contact the latch in two or more orthants of four orthants sectioned by a vertical line extended in the vertical direction and a horizontal line perpendicular to the vertical line, the lines passing a center of rotation of the latch shaft.

Advantageous Effects of Invention

In the present invention, when a latch reaches an over-rotation position, the latch contacts a base portion of a ratchet. This contact allows the over-rotation force acting on the latch to be supported by the ratchet shaft.

In the present invention, the over-rotation force acting on the latch can be appropriately supported by the ratchet shaft without having the ratchet rotated.

In the present invention, the over-rotation force acting on the latch is supported by the ratchet disposed opposite to the latch shaft across a striker guiding path. Load applied to a base plate as the hood is closed is therefore distributed.

In the present invention, the over-rotation force acting on the latch is distributed to a ratchet contact arm formed on a side of the latch and a plate contact surface formed on the other side of the latch and transmitted to the base portion and the base plate. This configuration can appropriately balance the center of gravity of a rotating latch.

In the present invention, the plate contact surface is efficiently supported by a step plate.

In the present invention, the base portion is located above a connection line, which is quite effective in supporting the over-rotation force of the latch.

In the present invention, the latch is supported at its upper part and lower part across the connection line, which is effective in dispersedly supporting the over-rotation force of the latch in a more efficient manner.

In the present invention, the over-rotation force acting on the latch is distributed to a plurality of supporting members and supported by the members. The supporting members are dispersedly located in two or more orthants, of four orthants created with a vertical line and a horizontal line to the latch shaft. This layout is more effective in supporting the latch.

In the present invention, the over-rotation force acting on the latch is distributed to the supporting members and supported by the members. The supporting members are dispersedly located in three or more orthants, of four orthants created with the vertical line and the horizontal line to the latch shaft. This layout is more effective in supporting the latch.

In the present invention, at least two supporting members are selected from the base portion of the ratchet, an over-rotation stopping hook of the ratchet, a step plate of the base plate, and an over-rotation stopping projection of the base plate. This configuration allows more efficient and simple design.

In the present invention, a bottom wall of the striker guiding path can be used as the supporting member, which allows more efficient and simple design.

DESCRIPTION OF EMBODIMENTS

Figure 1:
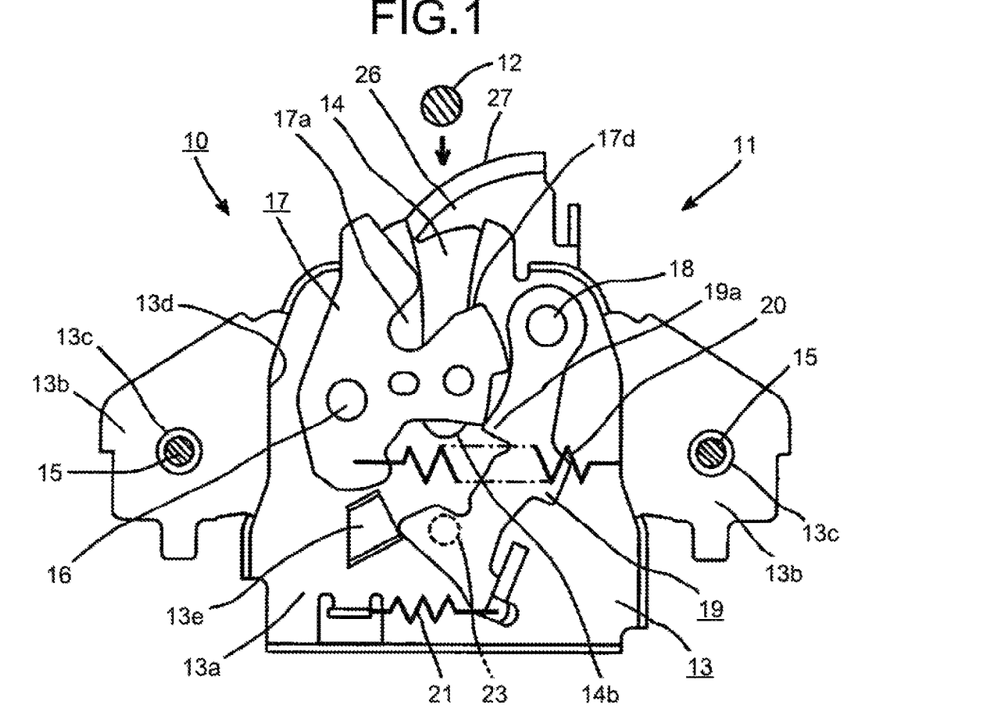
FIG. 1 is a front view of a hood latch assembly according to the present invention in an open state.

An embodiment of the present invention will now be described with reference to the drawings. FIG. 1 is a front view of a hood latch assembly 10 for engine hood according to the present invention. Many types of vehicles have an engine room in the front of the vehicle body. A common hood (not illustrated) covering the engine room has its rear end portion (base end portion) secured to the vehicle body with hinges or similar parts. The hood latch assembly 10 includes a latch unit 11 fixed to the front end of the vehicle body and a striker 12 fixed to the front end portion (rotational end portion) of the hood.

Figure 2:
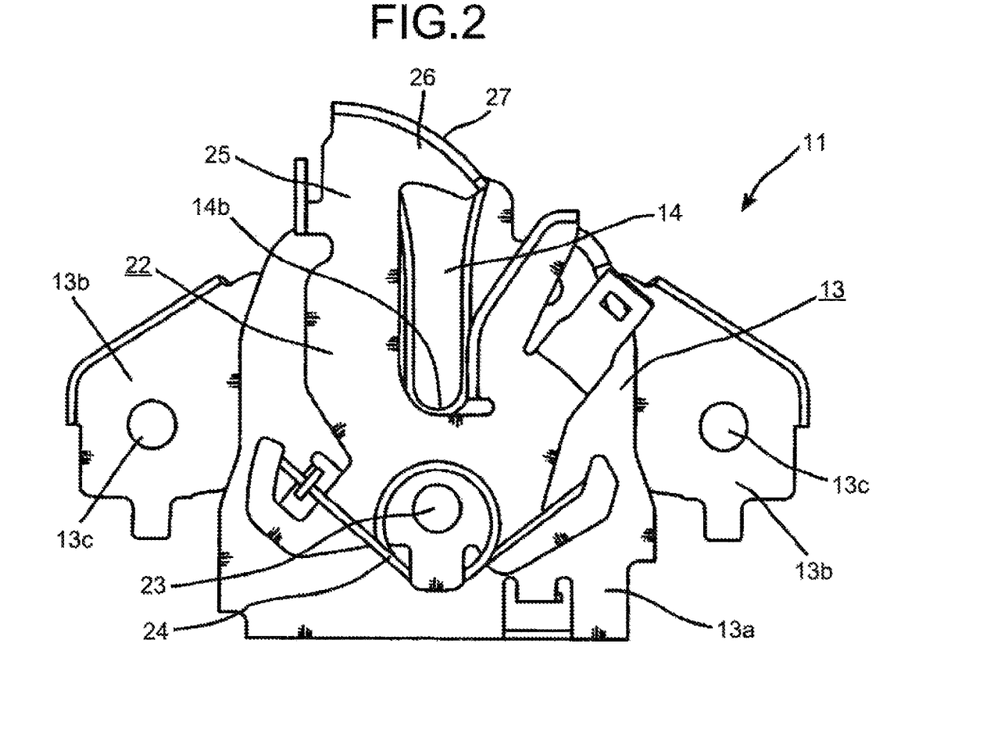
FIG. 2 is a back view of a latch unit with members on the front side omitted.
Figure 3:
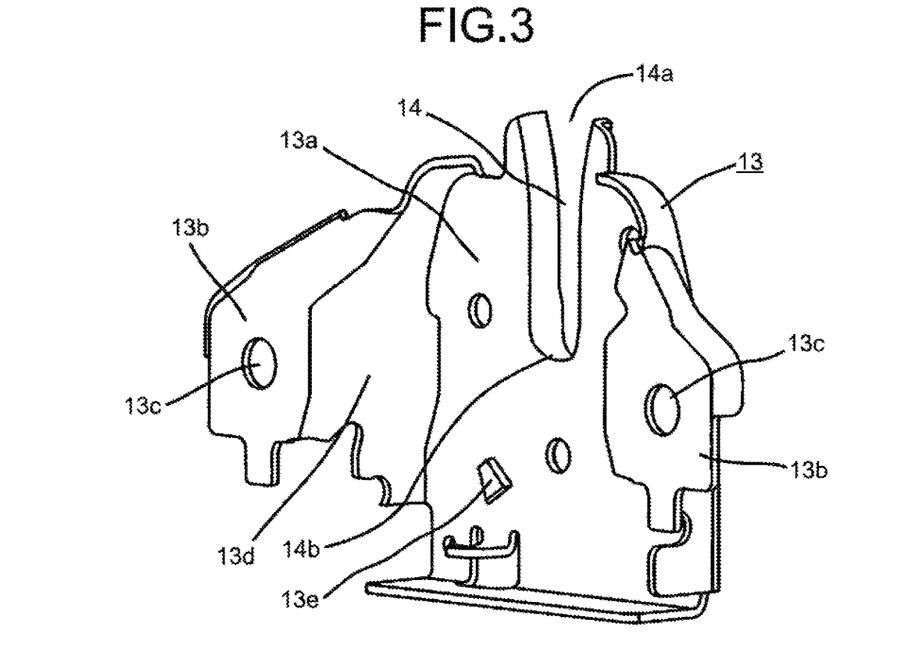
FIG. 3 is a perspective view of a base plate.

The latch unit 11 includes a metal base plate 13. The base plate 13 is produced by pressing and includes a center plate 13a and right and left fixing plates 13b as illustrated in FIG. 1 to FIG. 3. The center plate 13a has a striker guiding path 14 at its upper center portion. The striker guiding path 14 is U-shaped in the vertical direction and has an opening 14a at its upper end and a bottom wall 14b at its lower end. The fixing plate 13b is planarly contacting the vehicle body (not illustrated) and is fixed to the vehicle body with a fastener 15, such as a bolt, arranged in a mounting hole 13c. As the hood is closed, the striker 12 enters the striker guiding path 14.

The center plate 13a is separated from the fixing plate 13b by a step plate 13d of the base plate 13 to provide a certain step therebetween. In this state, the center plate 13a and the fixing plate 13b are substantially parallel to each other. The certain step allows the striker 12 to enter the striker guiding path 14 without contacting the vehicle body.

A latch 17 is secured by a latch shaft 16 to the left part of the center plate 13a. A ratchet 19 is secured by a ratchet shaft 18 to the right part of the center plate 13a. The latch shaft 16 and the ratchet shaft 18 have the axes parallel to each other and are arranged opposite to each other across the striker guiding path 14.

The latch 17 is pushed counterclockwise (in an unlatching direction, that is, a direction to open the hood) by the spring force of a latch spring 20. The ratchet 19 is pushed in a latch engagement direction (clockwise) by the spring force of a ratchet spring 21.

As illustrated in FIG. 2, a hook lever 22 is secured by a shaft 23 on the back of the base plate 13. The hook lever 22 is pushed clockwise in FIG. 2 (counterclockwise in FIG. 1) by a hook spring 24. A hood hook 26 to close the top of the striker guiding path 14 is provided at the front end of a hook arm 25 extended upward from the hook lever 22. The hood hook 26 has a slant contact surface 27 at its upper end.

FIG. 1 illustrates the hood latch assembly 10 when the hood is open (in an unlatching state). Upon closure of the hood, the striker 12 moves downward and contacts the slant contact surface 27 of the hook lever 22. The hook lever 22 is rotated clockwise against the spring force of the hook spring 24, which permits the striker 12 to enter the striker guiding path 14.

The latch 17 has a striker engagement slot 17a that engages with the striker 12 entering the striker guiding path 14. The striker engagement slot 17a is U-shaped and extended in the radial direction of the latch shaft 16. The lower part of the striker engagement slot 17a serves as a contact wall surface 17b configured to contact the striker 12 moving in the direction to close the hood. The upper part of the striker engagement slot 17a serves as a holding wall surface 17c to hold the striker 12 at a hood closing position. The opening of the striker engagement slot 17a flares out.

The latch 17 and the ratchet 19 are disposed on the same plane of rotation. The latch 17 has a claw engagement surface 17d, and the ratchet 19 has a claw 19a engageable with the claw engagement surface 17d. In the embodiment, the claw engagement surface 17d is provided at a location extended from the contact wall surface 17b.

Figure 4:
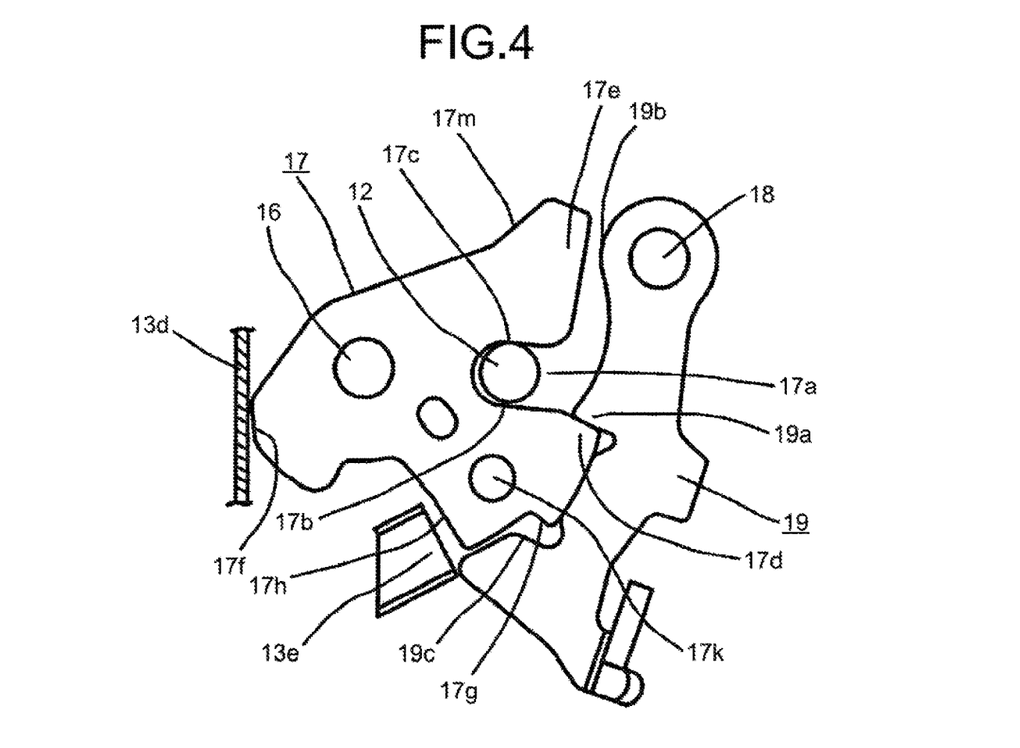
FIG. 4 is a front view of a latch at a latching position and a ratchet.

Upon contact of the striker 12 with the striker engagement slot 17a, the latch 17 is rotated in the direction to close the hood from the unlatching position (hood opening position) of FIG. 1 against the spring force of the latch spring 20. The latch 17 is then over-rotated across the latching position (hood closing position). The over-rotated latch 17 is returned in the unlatching direction by the spring force of the latch spring 20. With the claw 19a of the ratchet 19 engaging with the claw engagement surface 17d of the latch 17, as illustrated in FIG. 4, the latch 17 is held at the latching position, and the hood is kept closed. With the hood kept closed, the force to open the hood acting on the striker 12 (hood) is supported by the holding wall surface 17c of the striker engagement slot 17a.

Figure 5:
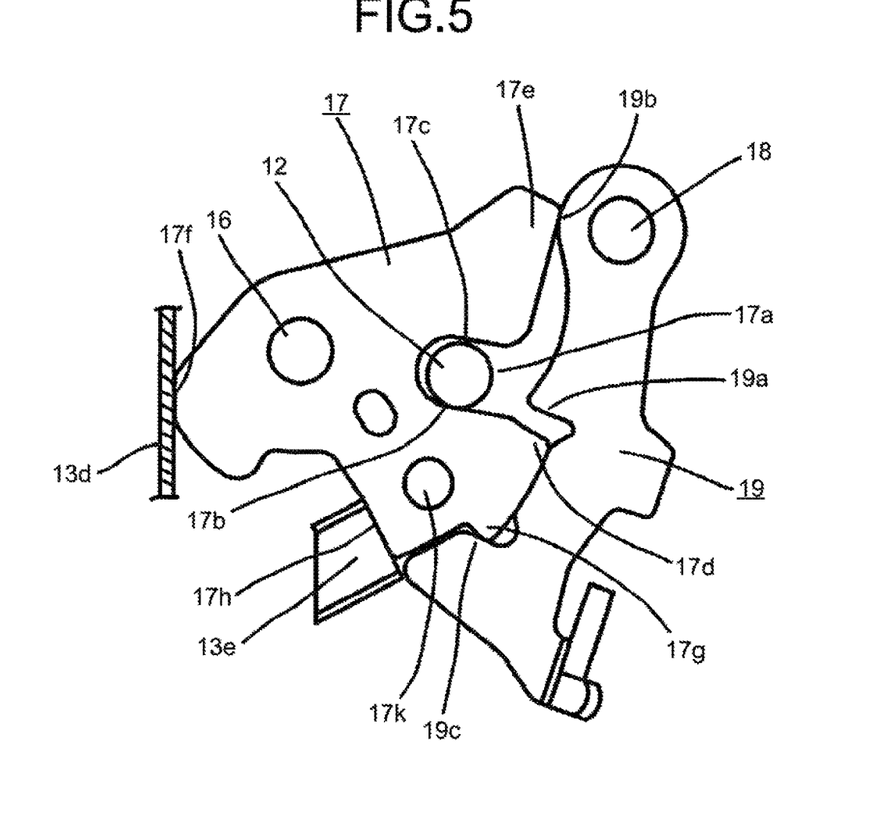
FIG. 5 is a front view of the latch at an over-rotation position and the ratchet.

According to the invention of the present application, when the latch 17 is rotated to a determined over-rotation position illustrated in FIG. 5, the latch 17 contacts a plurality of supporting members at the same time. This contact allows the over-rotation force (the transition force of the striker 12 to close the hood) acting on the latch 17 to be dispersedly supported by the supporting members. The details will now be described.

A first supporting member is a base portion 19b of the ratchet 19. The latch 17 has a ratchet contact arm 17e configured to contact the base portion 19b. The ratchet contact arm 17e contacts the outer surface of the base portion 19b. The outer surface is an arcuate surface with the ratchet shaft 18 centered. When the latch 17 reaches the determined over-rotation position, the ratchet contact arm 17e contacts the base portion 19b. The over-rotation force of the latch 17 is (partially) transmitted to the ratchet shaft 18 through the base portion 19b and supported by the ratchet shaft 18.

Since the base portion 19b is an arcuate surface with the ratchet shaft 18 centered, the force transmitted from the ratchet contact arm 17e to the base portion 19b is transmitted to the ratchet shaft 18 without rotating the ratchet 19 regardless of the angle at which the ratchet contact arm 17e contacts. The over-rotation force of the latch 17 thus can be effectively supported by the ratchet shaft 18. The ratchet contact arm 17e is formed at a location extended from the holding wall surface 17c, which allows efficient and easy formation of the ratchet contact arm 17e around the outer peripheral portion of the latch 17.

A second supporting member is a step plate 13d of the base plate 13. The latch 17 has a plate contact surface 17f configured to contact the step plate 13d. The plate contact surface 17f contacts the step plate 13d when the latch 17 reaches the determined over-rotation position. The over-rotation force of the latch 17 is (partially) transmitted to the step plate 13d and supported by the base plate 13. Since the step plate 13d used as the second supporting member is an existing plate, more efficient design is achieved.

A third supporting member is an over-rotation stopping hook 19c of the ratchet 19. The over-rotation stopping hook 19c is provided at a front end of the ratchet 19. The latch 17 has a ratchet contact surface 17g configured to contact the over-rotation stopping hook 19c. The ratchet contact surface 17g is a surface facing opposite the claw engagement surface 17d. When the latch 17 reaches the determined over-rotation position, the ratchet contact surface 17g is therefore allowed to contact the over-rotation stopping hook 19c of the ratchet 19. Upon this contact, the over-rotation force of the latch 17 is (partially) transmitted to the over-rotation stopping hook 19c and supported by the ratchet 19.

The ratchet contact surface 17g and the over-rotation stopping hook 19c can be easily formed on the existing latch 17 and the ratchet 19. The over-rotation force transmitted from the latch 17 to the ratchet 19 is supported by the ratchet shaft 18. The vector of the force applied to the ratchet shaft 18 through the over-rotation stopping hook 19c is different from the vector of the force applied to the ratchet shaft 18 through the ratchet contact arm 17e by approximately 90 degrees. No excessive load is therefore applied to the ratchet shaft 18.

A fourth supporting member is an over-rotation stopping projection 13e formed on the center plate 13a. The latch 17 has a projection contact surface 17h configured to contact the over-rotation stopping projection 13e. When the latch 17 reaches the determined over-rotation position, the projection contact surface 17h contacts the over-rotation stopping projection 13e and (partially) transmits the over-rotation force of the latch 17 to the over-rotation stopping projection 13e. The over-rotation force is supported by the over-rotation stopping projection 13e.

Figure 9:
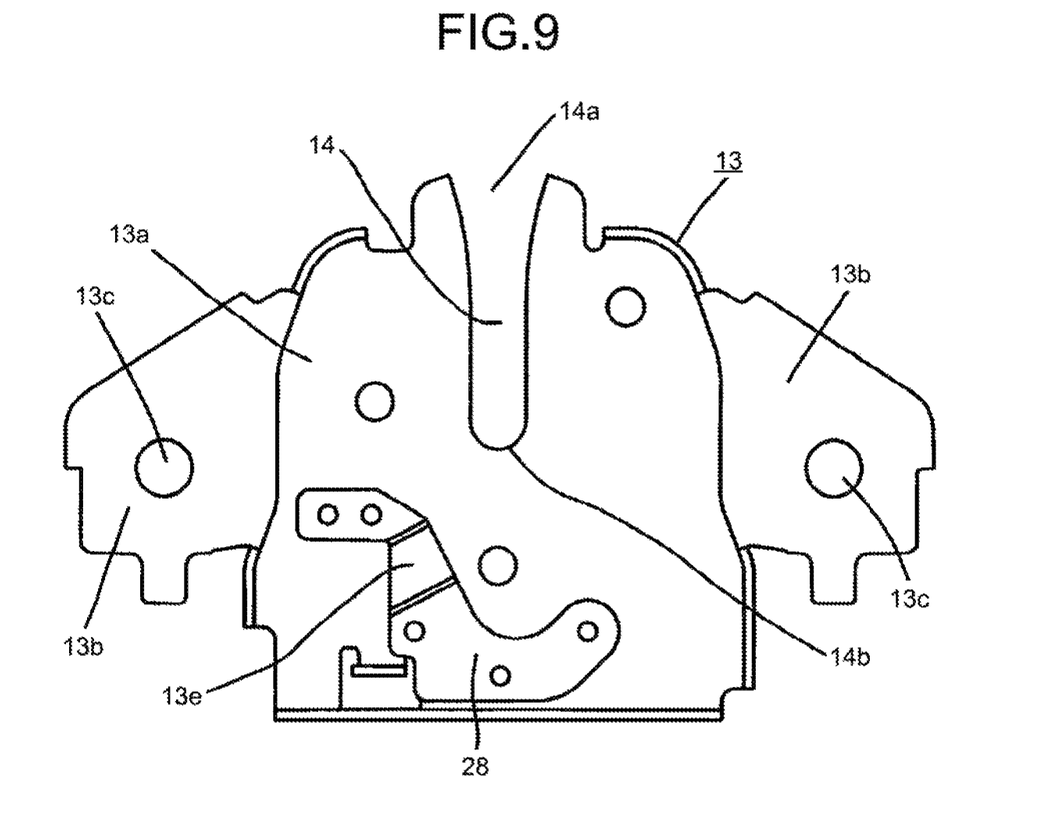
FIG. 9 is a front view of the base plate with a patch member added.
Figure 10:
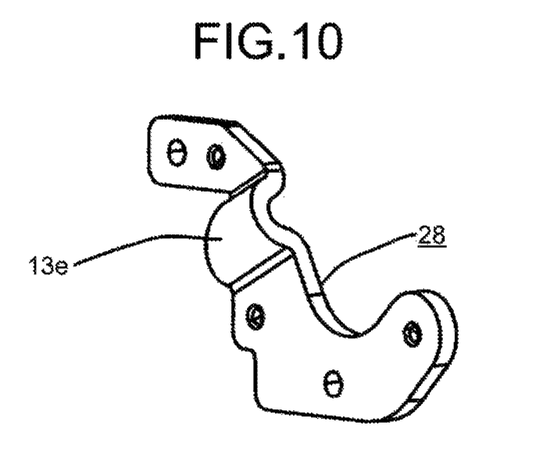
FIG. 10 is a perspective view of the patch member.

The over-rotation stopping projection 13e may be formed on the center plate 13a by pressing. As illustrated in FIG. 9, a patch member 28 (see FIG. 10) may be provided to the center plate 13a, and the over-rotation stopping projection 13e may be formed on the patch member 28. The patch member 28 may be transversely elongated so as to overlap with a lower extension of the striker guiding path 14. This layout allows a wider area of the lower part of the center plate 13a to be reinforced.

According to the invention of the present application, as described above, when the latch 17 is rotated to the determined over-rotation position, the latch 17 contacts a plurality of supporting members (the base portion 19b of the ratchet 19, the step plate 13d, the over-rotation stopping hook 19c of the ratchet 19, and the over-rotation stopping projection 13e of the center plate 13a) at the same time. This simultaneous contact allows the over-rotation force (the transition force of the striker 12 to close the hood) of the latch 17 to be dispersedly supported by the members, which is beneficial in preventing deformation and breakage of the members.

The above description is based on the assumption that the striker 12 does not contact the bottom wall 14b of the striker guiding path 14 when the latch 17 is rotated to the determined over-rotation position. The invention of the present application is, however, based on the technical thought that the latch 17 is designed to contact a plurality of supporting members so that the over-rotation force acting on the latch 17 is dispersedly supported by the members. Based on this thought, the invention of the present application is allowed to further include the thought that, when the latch 17 is rotated to the determined over-rotation position, the transition force of the striker 12 to close the hood, the force which brings the over-rotation force to the latch 17, is dispersedly absorbed with the latch 17 directly contacting the striker 12.

According to the invention of the present application, when the latch 17 is rotated to the determined over-rotation position, the striker 12 may be allowed to contact the bottom wall 14b of the striker guiding path 14. In this case, the bottom wall 14b actually functions as a fifth supporting member.

In the above description, the latch 17 (and the striker 12) contacts the supporting members at the "same time" when the latch 17 is rotated to the determined over-rotation position. The phrase "same time" implies a certain length of time in which the latch 17 (and the striker 12) contacts the supporting members in no particular order.

Figure 8:
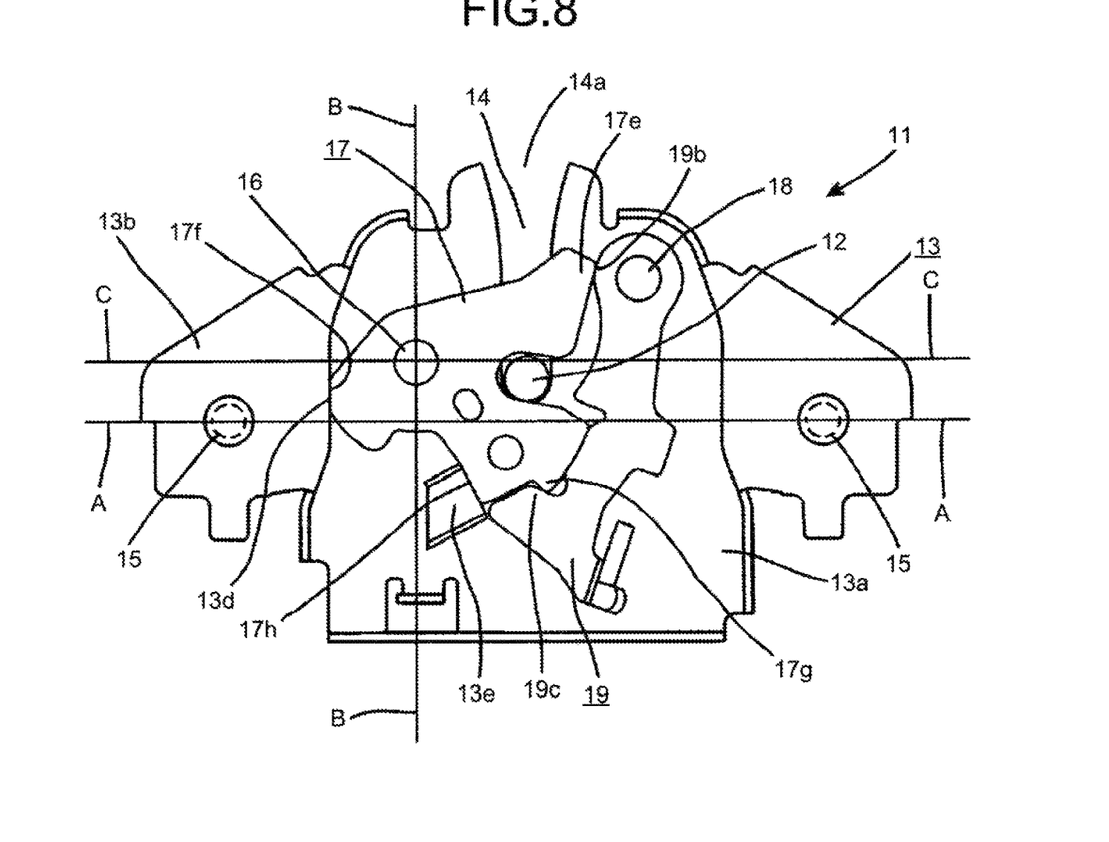
FIG. 8 is a front view of the latch unit with a connection line A connecting right and left fasteners, a vertical line B and a horizontal line C passing the center of rotation of the latch shaft.

The base plate 13 is fastened to the vehicle body with right and left fasteners 15 and 15. As illustrated in FIG. 8, the base plate 13 (the latch unit 11) is divided into an upper area and a lower area by a connection line A connecting the right and left fasteners 15 and 15. The connection line A is perpendicular to the striker guiding path 14 (to the direction in which the striker 12 moves). Separately disposing the supporting members in the upper area (the area having the opening 14a of the striker guiding path 14) and in the lower area across the connection line A is more advantageous in dispersedly supporting the over-rotation force (the transition force to close the hood).

Since there are no conventional supporting members to be disposed above the connection line A, the base portion 19b located above the connection line A serves as an important supporting member. Combining the base portion 19b and members located below the connection line A, such as the over-rotation stopping hook 19c and the over-rotation stopping projection 13e, is therefore an effective method to dispersedly support the over-rotation force (the transition force to close the hood).

Arrangement of the supporting members will be further described. As illustrated in FIG. 8, the supporting members are preferably separately disposed in four orthants divided by a vertical line B (a line parallel to the direction in which the striker 12 moves) and a horizontal line C, the lines passing the center of rotation of the latch shaft 16. One of the orthants including the ratchet shaft 18 is defined as a first orthant. The ratchet contact arm 17e contacts the base portion 19b of the ratchet 19 in the first orthant. The second to the fourth orthants are sequentially designated counterclockwise from the first orthant, according to geometry.

The plate contact surface 17f of the latch 17 contacts the step plate 13d of the base plate 13 in the third orthant. This layout allows the plate contact surface 17f to be located opposite to the ratchet contact arm 17e across the latch shaft 16, which can reduce deviation of the center of gravity of a rotating latch 17.

The over-rotation stopping hook 19c, the over-rotation stopping projection 13e, and the bottom wall 14b are arranged in the fourth orthant.

In the embodiment, the over-rotation force (the transition force to close the hood) of the latch 17 (and the striker 12) is supported at respective locations of five supporting members (the base portion 19b, the step plate 13d, the over-rotation stopping hook 19c, the over-rotation stopping projection 13e, and the bottom wall 14b). Such a configuration is also effective that supports the over-rotation force (the transition force to close the hood) at the location of any one (preferably, the base portion 19b) of the supporting members or, more preferably, at two or more locations.

The width of the striker engagement slot 17a of the latch 17 is larger than the diameter of the striker 12 by approximately 0.5 to 1 mm, which enables smooth engagement of the striker 12 with the striker engagement slot 17a when the hood is closed.

As illustrated in FIG. 4, in the latching state, the latch 17 is kept at the latching position by being engaged with the ratchet 19, while the striker 12 is kept in the hood-closing state by the holding wall surface 17c of the striker engagement slot 17a. In the hood-closing state, the striker 12 is separated from the striker engagement slot 17a with a small gap. For example, when vibrations occur with the vehicle traveling, kinetic force with vertical amplitude acts on the hood. This event renders the striker 12 to contact the contact wall surface 17b of the striker engagement slot 17a, and noise is generated. This noise is called a rattling noise.

Figure 11:
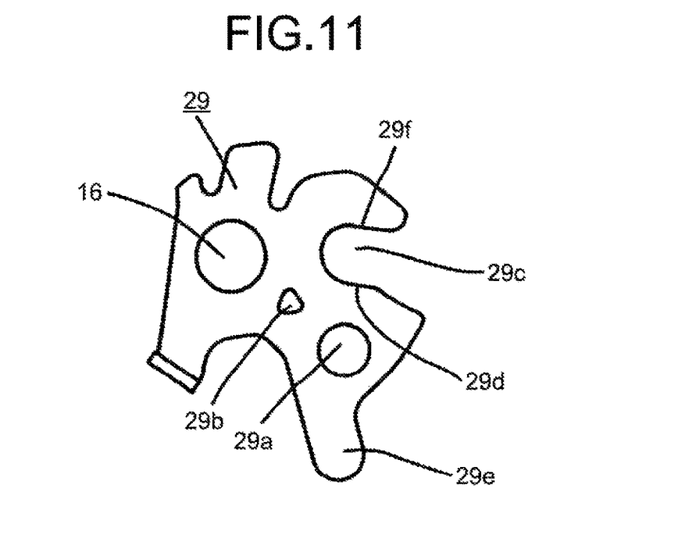
FIG. 11 is a front view of an anti-rattling lever.
Figure 12:
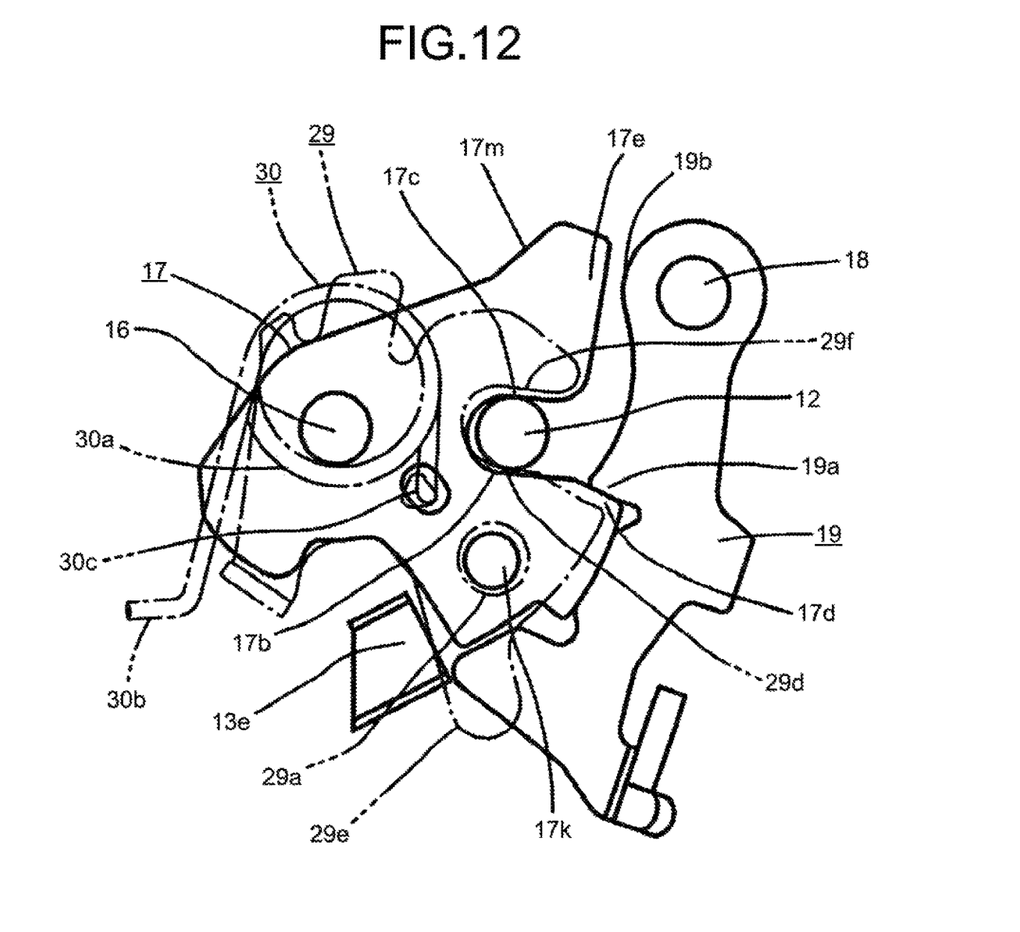
FIG. 12 is a front view of the structure of FIG. 4 with the anti-rattling lever and an anti-rattling spring added.

In the present invention, an anti-rattling lever 29 is secured to the latch shaft 16 to reduce the rattling noise (see FIG. 11 and FIG. 12). The latch 17 is preferably disposed between the base plate 13 and the anti-rattling lever 29.

The latch 17 has a convex or concave engagement portion 17k, and the anti-rattling lever 29 has a concave or convex engagement portion 29a. The engagement portion 17k and the engagement portion 29a are engaged with each other with a small clearance therebetween in the direction of rotation of the latch shaft 16. The latch 17 and the anti-rattling lever 29 are connected to rotate in conjunction with each other through a predetermined clearance.

The anti-rattling lever 29 is pushed by an anti-rattling spring 30 in the direction to open the hood. The anti-rattling spring 30 is preferably a torsion coil spring including a coil body 30a, a first leg 30b, and a second leg 30c. The coil body 30a is disposed around the outer periphery of the latch shaft 16. The first leg 30b has its front end contacting the step plate 13d of the base plate 13, and the second leg 30c has its front end anchored to an anchor hole 29b of the anti-rattling lever 29.

In use of the anti-rattling lever 29, an end of the latch spring 20 is connected to the anti-rattling lever 29, not to the latch 17. This configuration allows the latch 17 to be pushed hard in the direction to open the hood by two elastic forces of the latch spring 20 and the anti-rattling spring 30 through the anti-rattling lever 29. The anti-rattling lever 29 has an anti-rattling slot 29c to be engaged with the striker 12. The anti-rattling slot 29c has a similar shape as that of the striker engagement slot 17a of the latch 17. The striker 12 moves downward as the hood is closed and engages with the striker engagement slot 17a and the anti-rattling slot 29c, and rotates the latch 17 and the anti-rattling lever 29 in the direction to close the hood against the spring force of the latch spring 20 and the anti-rattling spring 30.

The latch 17 is arranged on the same plane as the ratchet 19, while the anti-rattling lever 29 is arranged on a different plane of rotation as that of the ratchet 19 and is therefore not engaged with the ratchet 19.

As illustrated in FIG. 12, in the latching state where the claw 19a of the ratchet 19 is engaged with the claw engagement surface 17d of the latch 17, the striker 12 is restricted from moving in the direction to open the hood (from moving upward) by the holding wall surface 17c of the striker engagement slot 17a.

Figure 13:
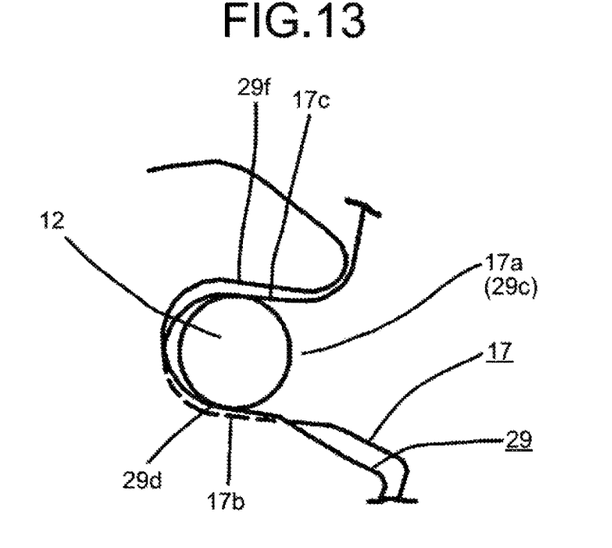
FIG. 13 is an illustrative drawing of a striker held by a holding wall surface of the latch and a pressing wall surface of the anti-rattling lever.

Since the anti-rattling lever 29 is separated from the latch 17 with a clearance in the direction of rotation, the anti-rattling lever 29 is rotated alone, with respect to the latch 17, in the unlatching direction (counterclockwise) by the spring force of the latch spring 20 and the anti-rattling spring 30. This rotation of the anti-rattling lever 29 causes a pressing wall surface 29d arranged on the lower side of the anti-rattling slot 29c to be pressed against the lower surface of the striker 12 by the large spring force of the latch spring 20 and the anti-rattling spring 30 as illustrated in FIG. 12 and FIG. 13. This manner can firmly keep the striker 12 from vibrating and accordingly reduce the rattling noise.

The anti-rattling lever 29 has a ratchet holder 29e. The ratchet holder 29e overlaps with the front end portion of the ratchet 19 in the axial direction of the ratchet shaft 18 in the hood-closing state, and overlaps with the base end portion of the ratchet 19 in the hood-open state.

For example, when the hood and the base plate 13 are deformed, external force along the axial direction of the ratchet shaft 18 may act on the ratchet 19. This external force acts to detach the claw 19a of the ratchet 19 from the claw engagement surface 17d of the latch 17; however, the ratchet holder 29e can keep the ratchet 19 from moving (being deformed) in the axial direction of the ratchet shaft 18.

When the striker 12 is quite strongly pulled up in the direction to open the hood in the hood-closing state, the holding wall surface 17c of the latch 17 may be subject to deformation and breakage. In this embodiment, the anti-rattling lever 29 has a reinforcing wall surface 29f arranged on the upper side of the anti-rattling slot 29c to reinforce the holding wall surface 17c of the latch 17. Upon deformation of the holding wall surface 17c due to pressure from the striker 12, the reinforcing wall surface 29f contacts the striker 12 and keeps the striker 12 from being detached.

Since the anti-rattling lever 29 has a similar shape as that of the latch 17 and overlaps with the latch 17, the latch 17 is kept from being deformed in the axial direction of the latch shaft 16.

Figure 6:
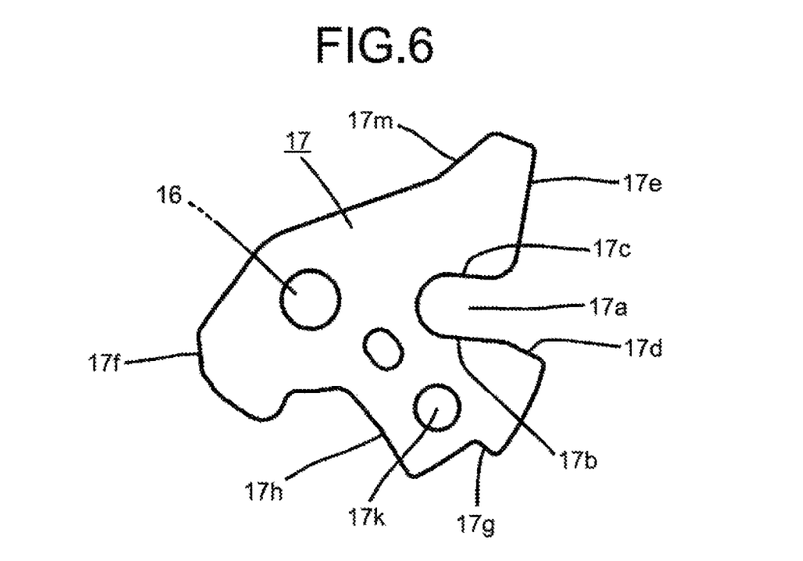
FIG. 6 is a front view of the latch.
Figure 7:
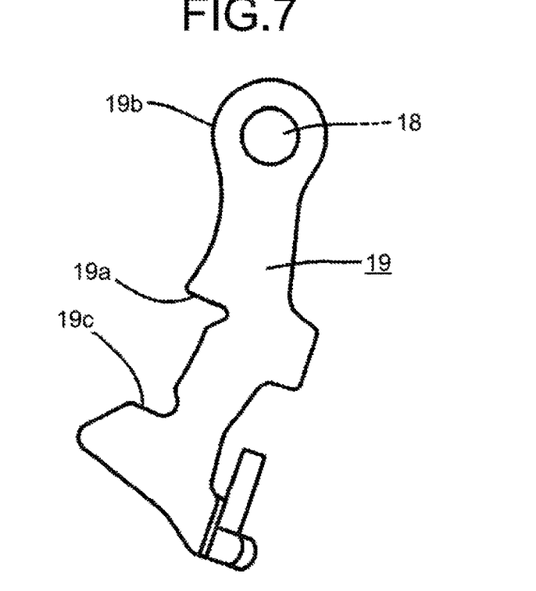
FIG. 7 is a front view of the ratchet.
Figure 14:
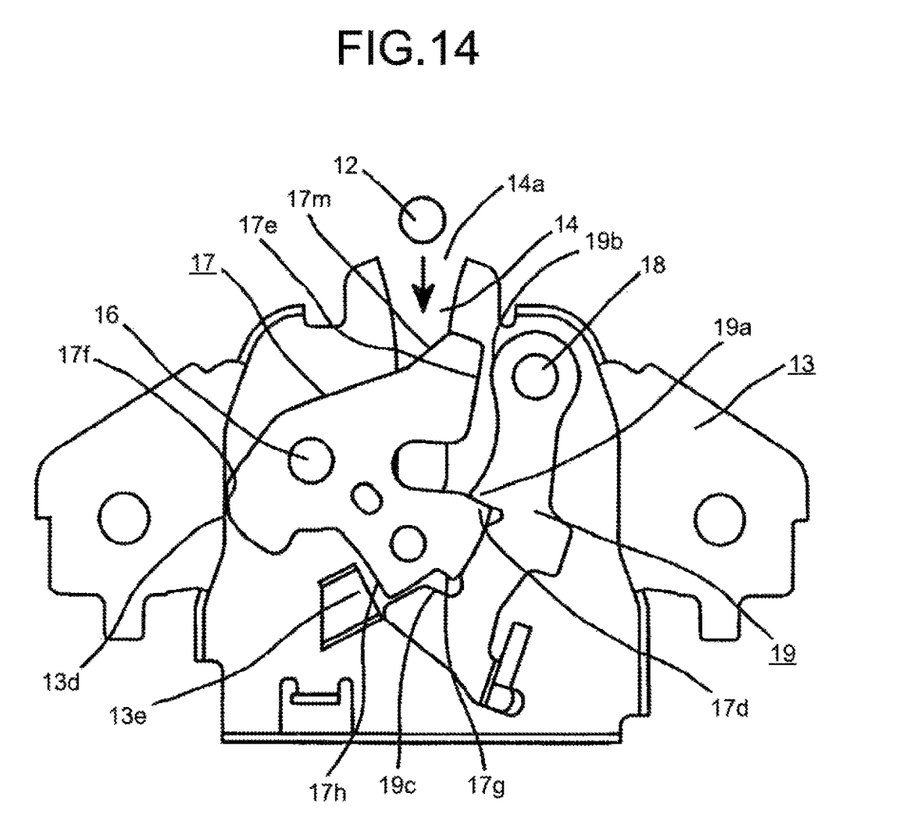
FIG. 14 is an illustrative drawing of the conditions when the latch is deliberately displaced to a latching position while the hood is open.

The latch 17 has an extra wall surface 17m that faces the opening 14a of the striker guiding path 14 when the latch 17 is at the latching position (see FIG. 6 and FIG. 14). The extra wall surface 17m has a surface along a radial direction of the latch shaft 16. If the latch 17 is deliberately moved to the latching position when the engine or the like is being inspected with the hood open, and, if the inspecting person closes the hood without noticing this, the striker 12 hits the latch 17 located at the latching position. When the striker 12 hits the extra wall surface 17m of the latch 17, the latch 17 is displaced to the over-rotation position. Use of a plurality of supporting members to dispersedly support the rotational force of the latch 17 is beneficial in protecting the latch unit 11 from such unforeseen damage.

REFERENCE SIGNS LIST

10 HOOD LATCH ASSEMBLY
11 LATCH UNIT
12 STRIKER
13 BASE PLATE
13a CENTER PLATE
13b FIXING PLATE
13c MOUNTING HOLE
13d STEP PLATE
13e OVER-ROTATION STOPPING PROJECTION
14 STRIKER GUIDING PATH
14a OPENING
14b BOTTOM WALL
15 FASTENER
16 LATCH SHAFT
17 LATCH
17a STRIKER ENGAGEMENT SLOT
17b CONTACT WALL SURFACE
17c HOLDING WALL SURFACE
17d CLAW ENGAGEMENT SURFACE
17e RATCHET CONTACT ARM
17f PLATE CONTACT SURFACE
17g RATCHET CONTACT SURFACE
17h PROJECTION CONTACT SURFACE
17k ENGAGEMENT PORTION
17m EXTRA WALL SURFACE
18 RATCHET SHAFT
19 RATCHET
19a CLAW
19b BASE PORTION
19c OVER-ROTATION STOPPING HOOK
20 LATCH SPRING
21 RATCHET SPRING
22 HOOK LEVER
23 SHAFT
24 HOOK SPRING
25 HOOK ARM
26 HOOD HOOK
27 SLANT CONTACT SURFACE
28 PATCH. MEMBER
29 ANTI-RATTLING LEVER
29a ENGAGEMENT PORTION
29b ANCHOR HOLE
29c ANTI-RATTLING SLOT
29d PRESSING WALL SURFACE
29e RATCHET HOLDER
29f REINFORCING WALL SURFACE
30 ANTI-RATTLING SPRING
30a COIL BODY
30b FIRST LEG
30c SECOND LEG
A CONNECTION LINE
B VERTICAL LINE
C HORIZONTAL LINE

The invention claimed is:

1. A hood latch assembly comprising:
a striker attached to a hood, wherein the hood is configured to be open or closed;
a base plate fixed to a vehicle body and having a striker guiding path at an upper center portion of the base plate, the striker guiding path extending in a vertical direction and being configured to receive the striker;
a latch secured to the base plate by a latch shaft, the latch being configured to be in i) an unlatching position corresponding to a hood opening position, ii) a latching position corresponding to a hood closing position, or iii) an over-rotation position, wherein, at a time of closing the hood, the latch rotates from the unlatching position, passes through the latching position to the over-rotation position, and returns to the latching position from the over-rotation position to the latching position;
a latch spring configured to push the latch to the latching position from the over-rotation position while the latch returns from the over-rotation position to the latching position at the time of closing the hood; and
a ratchet secured to the base plate by a ratchet shaft, the ratchet being configured to engage with the latch returning to the latching position from the over-rotation position by spring force of the latch spring when closing the hood and to maintain engagement of the latch with the striker while the latch is in the latching position,
wherein the latch has i) a ratchet contact arm including a planar surface and ii) a ratchet contact surface,
wherein the ratchet has i) a base portion and ii) an over-rotation stopping hook,
wherein, when the latch reaches the over-rotation position prior to returning to the latching position at the time of closing the hood, i) the planar surface of the ratchet contact arm of the latch is in planar contact with the base portion of the ratchet, ii) the ratchet contact surface contacts the over-rotation stopping hook of the ratchet, and iii) the base portion of the ratchet and the over-rotation stopping hook of the ratchet are located on a rotational trajectory of the latch, and
wherein, with the base plate fixed to the vehicle body via a fastener and divided into an upper area and a lower area by a connection line passing a center of the fastener in a horizontal direction perpendicular to the vertical direction, the base portion of the ratchet is located above the connection line.

2. The hood latch assembly according to claim 1, wherein the ratchet contact arm is configured to contact an arcuate surface of the base portion of the ratchet with the ratchet shaft centered.

3. The hood latch assembly according to claim 2, wherein the latch shaft and the ratchet shaft are disposed on respective sides of the base plate, the latch shaft and the ratchet shaft being opposite to each other across the striker guiding path.

4. The hood latch assembly according to claim 1, wherein the latch shaft and the ratchet shaft are disposed on respective sides of the base plate, the latch shaft and the ratchet shaft being opposite to each other across the striker guiding path.

5. The hood latch assembly according to claim 1, wherein the latch has a plate contact surface located opposite to the ratchet contact arm across the latch shaft, the plate contact surface being configured to contact the base plate when the latch reaches the over-rotation position.

6. The hood latch assembly according to claim 5, wherein the base plate includes: a center plate to which the latch and the ratchet are secured; a fixing plate planarly contacting the vehicle body and fixed to the vehicle body with a fastener; and a step plate for separating the center plate from the fixing plate, and the plate contact surface is configured to contact the step plate.

7. The hood latch assembly according to claim 1, wherein the base plate has at least one supporting member disposed below the connection line, the supporting member being configured to contact the latch when the latch reaches the over-rotation position.

8. The hood latch assembly according to claim 7, wherein the base plate is configured such that the striker contacts a bottom wall of the striker guiding path when the latch reaches the over-rotation position.

9. The hood latch assembly according to claim 1, wherein the base plate is configured such that the striker contacts a bottom wall of the striker guiding path when the latch reaches the over-rotation position.

* * * * *